Nov. 17, 1942.    H. ZÖLLNER    2,301,991
DEVICE FOR THE TRANSMISSION OF ELECTRIC CURRENT FROM
A RELATIVELY MOVED CONDUCTIVE SURFACE
Filed Feb. 16, 1940    2 Sheets-Sheet 1
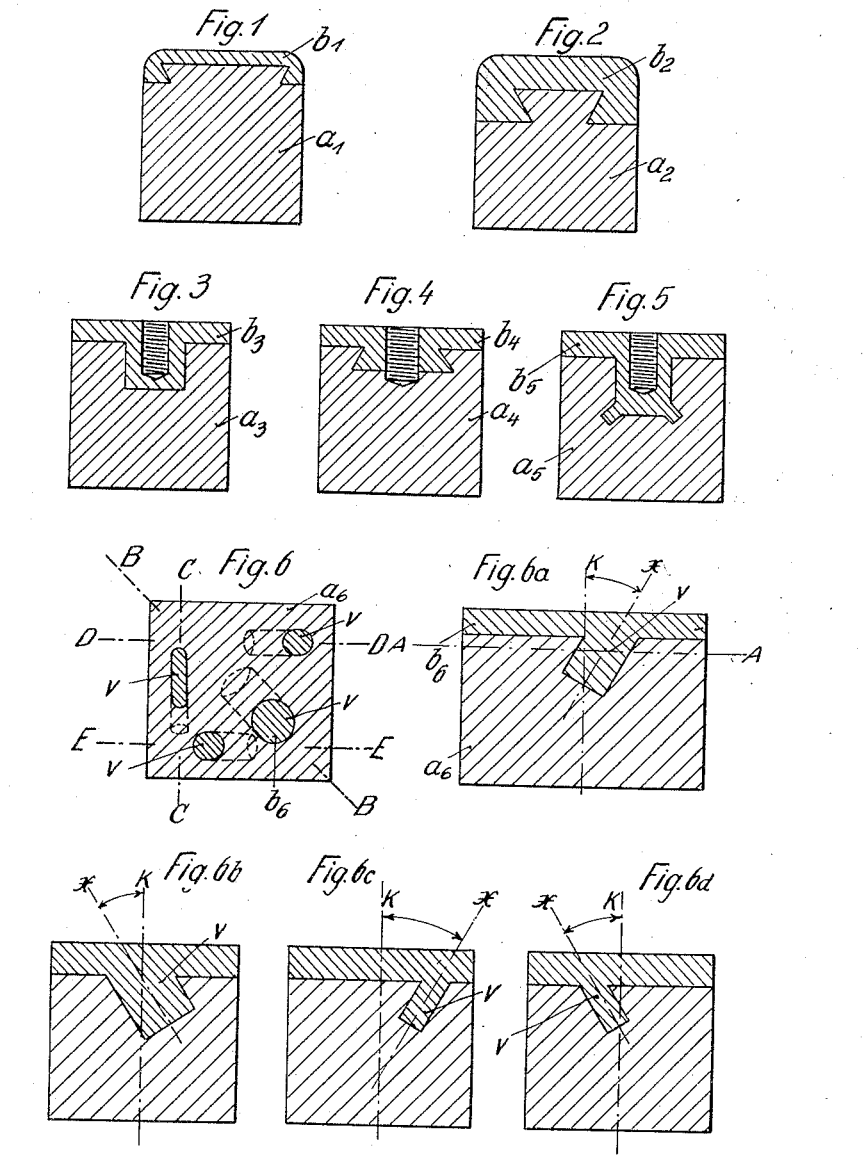
Inventor:
Hans Zöllner

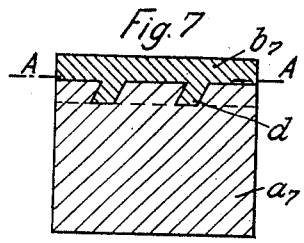
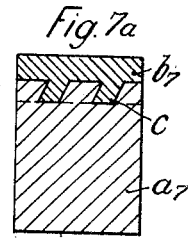
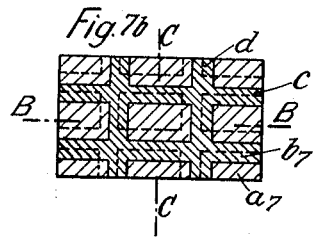
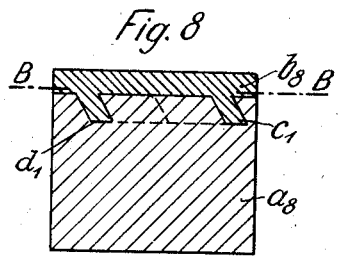
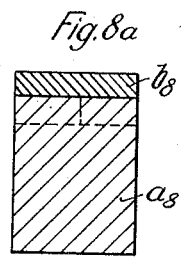
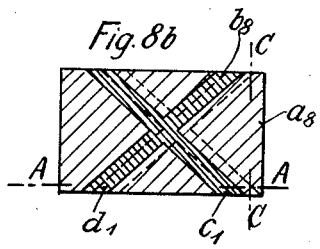

Patented Nov. 17, 1942

2,301,991

UNITED STATES PATENT OFFICE 2,301,991

DEVICE FOR THE TRANSMISSION OF ELECTRIC CURRENT FROM A RELATIVELY MOVED CONDUCTIVE SURFACE

Hans Zöllner, Lauf on the Pegnitz, Germany; vested in the Alien Property Custodian Application February 16, 1940, Serial No. 319,357
In Germany February 24, 1939

5 Claims. (Cl. 191—55)

This invention relates to a body made of synthetic carbon with a metal frame or holder cast on or forming an integral part of the whole.

The method of framing in metal synthetic carbon bodies, which conduct electric current, is well-known. The multiple use of synthetic carbon as trolley contact in the whole scope of electrotechnics does require this method in order to have as good a transfer of current as possible from the carbon across the frame to the power line and vice versa and, on the other hand, to allow said trolley contact to be installed in the various apparatus and plants by means of said frame as well as to give it the necessary strength required in actual operation.

Hitherto it has been the practice to press or clamp the carbon into either copper or brass frames or holders or to solder, rivet or screw-on certain metal frames or else to spray or cast material around the piece of synthetic carbon mounted in the frame. All methods hitherto known and practiced in order to provide a piece of carbon with a metal frame have shown certain disadvantages, however, the removal of which would mean an important advantage and considerable progress.

Mounted and clamped-on frames will usually cause high temperatures of the contact arrangement, due to high current-transfer losses, resulting in premature wear of the metal and loosening of the carbon seat. Moreover, such method of fastening movable contacts seems unsatisfactory from a purely mechanical point of view by inviting, as it does, the danger that the carbon is pushed out of the frame or is being gradually loosened by constant shocks during operation.

Screw and rivet connections between the carbon and the frame or holder have shown similar disadvantages, such as causing insufficient electric contact, which deteriorates even further with continued operation owing to spark formation and heating. In a similar manner the mechanical strength of the connection is gradually being reduced until it becomes unfit for further use. In case of soldered contacts, it has proven in actual practice that the soldering material gets soft during heavy loading, whereby the destructive factors already mentioned are brought about, finally causing the contacts to lose their function entirely.

The invention will be better understood by reference to the following detailed description in connection with the accompanying drawings showing by way of example some embodiments of the invention in comparison to known forms and in which—

Figs. 1 to 5 are cross sectional views of known forms of carbon and metal holder combinations while Figs. 6 to 8 are sectional views of various carbon and metal holder combinations having the invention applied thereto.

Fig. 6 is a section on line A—A of Fig. 6a.
Fig. 6a is a section on line B—B of Fig. 6.
Fig. 6b is a section on line C—C of Fig. 6.
Fig. 6c is a section on line D—D of Fig. 6.
Fig. 6d is a section on line E—E of Fig. 6.
Fig. 7 is a section on line B—B of Fig. 7b.
Fig. 7a is a section on line C—C of Fig. 7b.
Fig. 7b is a section on line A—A of Fig. 7.
Fig. 8 is a section on line A—A of Fig. 8b.
Fig. 8a is a section on line C—C of Fig. 8b.
Fig. 8b is a section on line B—B of Fig. 8.

Similar reference numerals denote similar parts in the different views.

When using carbon contact pieces with metal framing (Fig. 1), it has been found that the carbon $l$ becomes loose owing to the metal frame or holder $b_1$ extending by the heat. If, in order to prevent this heating effect, the metal of the frame is made stronger, in accordance with Fig. 2, it has been found in actual practice that during the cooling process, following the casting operation, the metal is subject to shrinkage which will absolutely destroy the carbon $a_2$.

Furthermore, the method of making castings $b_3$ or $b_4$ fitting the shape of cylindric bore holes (Fig. 3) or dovetailed segments (Fig. 4) in the carbon bodies $a_3$ or $a_4$, respectively, is well-known. But also in this case, the shrinkage of the casting will invariably result in the seat of the metal frame getting loose. In order to prevent the castings from falling out of the bore-holes, supplementary extensions have been fitted on the metal holders $b_5$ for engagement with the carbon bodies $a_5$, as shown in Fig. 5. But all these precautionary measures cannot prevent the cast frames mounted on top of or within the carbon pieces from getting heated by its loose contact with the carbon, especially when the current is passing through. This generating of heat, in the case of a thin metal frame, will melt it and thereby render the contact useless, while in the case of a thicker metal frame, its increased expansion will burst the carbon entirely or at least cause it to split off.

Referring now to Figs. 6, 6a, 6b, 6c and 6d showing the invention, it will be seen that the carbon body $a_6$ to be mounted by a metal casting $b_6$ is provided on its mounting surface with several recesses or indentations V, the centre lines X of which form an angle with the centre line K of the carbon body. This method of procedure, according to the present invention, will bring about that the frame casting is anchored absolutely tight within and on top of the carbon. Since the carbon is not entirely surrounded by metal, the possibility of shrinkage has been materially reduced; likewise, the potential shrinkage is so small as not to affect the carbon at all.

It is also suggested in accordance with Figs. 7, 7a and 7b, to work lengthwise and/or crosswise grooves $c$ and $d$ into the carbon body $a_7$ and to set them at an angle to the centre line of the body, thus reducing further the shrinkage actively working upon the carbon, which is the case especially if said grooves are made to run parallel with each other, as indicated in Fig. 7b. The same effect is obtained if, instead of the parallel running grooves, as above-described grooves $c_1$ and $d_1$ are arranged diagonally in the carbon body $a_8$, i. e., at an angle to the centre-line of the body, as indicated in Fig. 8.

The indentations, recesses or grooves can be worked into the carbon by drilling, bevelling, surface planing or pressing or according to any other method suitable for synthetic carbon.

It will be understood from the foregoing that, when following the method of procedure as above described, the metal frame casting or holder $b_6$ or $b_7$ or $b_8$, respectively, will not get loose by the heat generated during operation, since the cast prongs, ribs and so on lying within the carbon indentations will press against different carbon surfaces and thus grip the carbon tightly. Strong differences in temperature such as may be experienced during the manufacture of carbon bodies mounted by cast metal frames, will only bring about a shifting of the forces holding the carbon, within the area covered by the casting, and assure the permanently good electric contact between the carbon and the metal frame.

An increased fusioning of the mechanical and electrical connections between the carbon and the cast metal frame is accomplished by roughening the surface of the carbon to be mounted by the metal casting instead of using the carbon body with the customary smooth facing obtained by the pressing and/or a subsequent grinding operation, as in this case the casting will get an even firmer grip on a rough surface.

The electric contact between the carbon body and its metal holder may be further enhanced by metallising the carbon surfaces engaged by the metal casting by a galvanic copper coating, for instance, or by a metal spraying operation, including therein all projections and indentations, as above described, before the metal casting is applied thereto.

The method and apparatus of the present invention have been described in detail with reference to specific embodiments. It is to be understood, however, that the invention is not limited by such specific reference but is broader in scope and capable of other embodiments than those specifically described and illustrated in the drawings.

I claim:

1. A device for the transmission of electric current from a relatively movable conductive surface, comprising a body of synthetic carbon having a flat surface on one side thereof and recesses extending from and inclined in different directions relative to its flat surface, and a cast metal holder having a flat surface with projecting portions inclined in different directions relative to its surface corresponding to and provided in the recesses in the carbon body, said flat surfaces of the body and holder being face to face relative to each other, and a center line passing through a vertical axis of the carbon body will form angles to the center lines passing through the projecting portions to firmly anchor the carbon body to the metal holder.

2. A device according to claim 1, in which the recesses in the carbon body are in the form of grooves inclined in different directions and in which the projecting portions are in a form corresponding to said grooves and inclined in said directions.

3. A device according to claim 1, in which the recesses in the carbon body are in the form of grooves which are parallel to each other and are inclined in said directions and in which the projecting portions on the metal holder are also parallel to each other corresponding to the grooves and are inclined in different directions.

4. A device according to claim 1, in which the recesses in the carbon body are in the form of at least two diagonal grooves inclined in different directions and in which the projecting portions on the metal holder correspond in number to the grooves and are inclined in said directions.

5. A device for the transmission of electric current from a relatively movable conductive surface, comprising a body of synthetic carbon having a flat surface on one side thereof and recesses extending from and inclined in different directions relative to its flat surface, and a cast metal holder having a flat surface with projecting portions inclined in said directions relative to its surface corresponding to and provided in the recesses in the carbon body, said flat surfaces of the body and holder being face to face relative to each other, and a center line passing through a vertical axis of the carbon body will form angles to the center lines passing through the projecting portions to firmly anchor the carbon body to the metal holder, the surfaces of said recesses being roughened for engagement with the projecting portions of the metal holder.

HANS ZÖLLNER.